(12) United States Patent
Delgado

(10) Patent No.: US 10,684,110 B1
(45) Date of Patent: Jun. 16, 2020

(54) ADJUSTABLE ANGLE-MEASURING DEVICE

(71) Applicant: Raul Delgado, Hialeah, FL (US)

(72) Inventor: Raul Delgado, Hialeah, FL (US)

( * ) Notice: Subject to any disclaimer, the term of this patent is extended or adjusted under 35 U.S.C. 154(b) by 217 days.

(21) Appl. No.: 15/958,802

(22) Filed: Apr. 20, 2018

(51) Int. Cl.
*G01B 3/56* (2006.01)
*G01B 3/08* (2006.01)

(52) U.S. Cl.
CPC .............. *G01B 3/563* (2013.01); *G01B 3/08* (2013.01)

(58) Field of Classification Search
CPC .......... G01B 3/566; G01B 3/563; G01B 3/04; G01B 3/56; G01B 3/08; G01B 3/1092; G01B 2003/1074; G01B 3/1003
USPC .......................................................... 33/471
See application file for complete search history.

(56) References Cited

U.S. PATENT DOCUMENTS

| | | | | |
|---|---|---|---|---|
| 614,985 A * | 11/1898 | Ruffin | .............. | G01B 3/56 33/421 |
| 780,954 A * | 1/1905 | McCartney | .............. | G01B 3/56 33/419 |
| 1,290,977 A * | 1/1919 | Greene | .............. | G01B 3/56 33/425 |
| 2,504,244 A * | 4/1950 | Barclay | .............. | G01B 3/56 33/419 |
| 2,517,264 A * | 8/1950 | Wake | .............. | G01B 3/563 33/419 |
| 2,735,184 A * | 2/1956 | Chamberlain | ...... | E04G 21/1891 33/455 |
| 2,759,267 A * | 8/1956 | Wood | .............. | G01B 5/004 33/419 |
| 3,562,919 A * | 2/1971 | Green | .............. | B25H 7/04 33/25.1 |
| 4,712,307 A * | 12/1987 | Kish | .............. | G01B 3/56 33/421 |
| 5,832,618 A * | 11/1998 | Scarborough | ........... | G01C 9/28 33/451 |

* cited by examiner

*Primary Examiner* — Yaritza Guadalupe-Mccall
(74) *Attorney, Agent, or Firm* — Sanchelima & Associates, P.A.; Christian Sanchelima; Jesus Sanchelima

(57) ABSTRACT

An adjustable angle-measuring device comprises first and second linear arms, a marking member, an arcuate tracking member, a locking element, and at least two support channels. The first linear arm comprises first and second ends. The first end of the first linear arm is rigidly attached perpendicular to a first end of the second linear arm. The marking member is detachably attached to an intersecting surface of the first and second linear arms to form a pivot. The marking member moves along the arcuate tracking member to determine an angular measurement between the first linear arm and the marking member and the second linear arm and the marking member. The marking member comprises a locking element to lock the marking member to the arcuate tracking member. Each of the support channels are positioned at the second ends of the first and second linear arms to detachably attach extension members.

7 Claims, 5 Drawing Sheets

ADJUSTABLE ANGLE-MEASURING DEVICE

I. BACKGROUND OF THE INVENTION

1. Field of the Invention

The present disclosure generally relates to angle measuring devices. More particularly, the present disclosure relates to an adjustable angle-measuring device comprising extendable arms.

2. Description of the Related Art

Angle measuring devices generally refer to devices capable of measuring angles between two surfaces. In building construction, carpentry, and other trades, angle measuring devices are essential to accurately create intersecting surfaces or joints of predetermined angles. For example, an angle measuring device may be used to determine the angle of a lap joint or angles between two walls. Once the required angle is determined, additional components or structures can be fabricated. Several existing angle-measuring devices are known in the art. Typically, angle measuring devices include two arms which pivot with respect to each other such that a flat, linear surface associated with each arm can be placed against surfaces which require angles to be measured. Gauges with gradation lines indicating diverse angle measurement allows an operator to read the measured angle. Devices with Vernier scales for added accuracy require skilled operators and careful observation of measurements to prevent errors. Reading errors, parallax errors, etc., can all occur in such equipment. A device, which requires minimal skill and provides quick angle measurement without error, is required.

Another disadvantage of existing angle-measuring devices is non-adjustable arms. During construction, not all areas are readily accessible. Sometime projections or obstructing structures such as doorway moldings prevent the arms of the measuring device from being suitably placed against the walls. In such cases, devices, which have adjustable arms are desired and offer multiple advantages. This prevents workers from carrying multiple devices with arms of multiple dimensions. Furthermore, existing angle measuring devices typically permit measuring angles between two surfaces at a time. A device, which allows measurement of angles between multiple surfaces, is therefore desired.

Hence, there is a long felt but unresolved need for a device, which requires minimal skill and provides quick angle measurement without error. Furthermore, there is a need for a device, which has adjustable arms to permit measurement of angles between surfaces that are difficult to access. Moreover, there is a need for a device, which allows measurement of angles between multiple surfaces.

II. SUMMARY OF THE INVENTION

The invention, disclosed herein, addresses the above-mentioned need for a device, which requires minimal skill and provides quick angle measurement without error. Furthermore, the invention addresses the need for a device, which has adjustable arms to permit measurement of angles between surfaces that are difficult to access. Moreover, the invention addresses the need for a device, which allows measurement of angles between multiple surfaces.

The present invention, disclosed herein, comprises first and second linear arms, a marking member, a tracking member adapted to be positioned under either first or second liner arms, this positioning of the tracking member allows it to come into abutting engagement with a surface's side such as a table so that the user can use the device without having it move since it is blocked from moving in one direction by the tracking member, a locking element on said tracking member, a diagonal member, and at least two support channels. The first linear arm comprises first and second ends. The first end of the first linear arm is rigidly attached perpendicular to a first end of the second linear arm. The marking member is detachably attached to an intersecting surface of the first and second linear arms to form a pivot. The marking member is configured to move along an arcuate tracking member to determine an angular measurement between the first linear arm and the marking member and the second linear arm and the marking member. The marking member comprises a locking element to lock the marking member to the arcuate tracking member. Each of the at least two support channels are positioned at the second ends of the first and second linear arms to detachably attach extension members.

Further objects of the invention will be brought out in the following part of the specification, wherein detailed description is for the purpose of fully disclosing the invention without placing limitations thereon.

III. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 exemplarily illustrates a rear view of an adjustable angle-measuring device with detached extension members.

FIG. 2 exemplarily illustrates a rear view of an adjustable angle-measuring device with attached extension members.

IV. DETAILED DESCRIPTION OF THE EMBODIMENTS OF THE INVENTION

Figure 1:
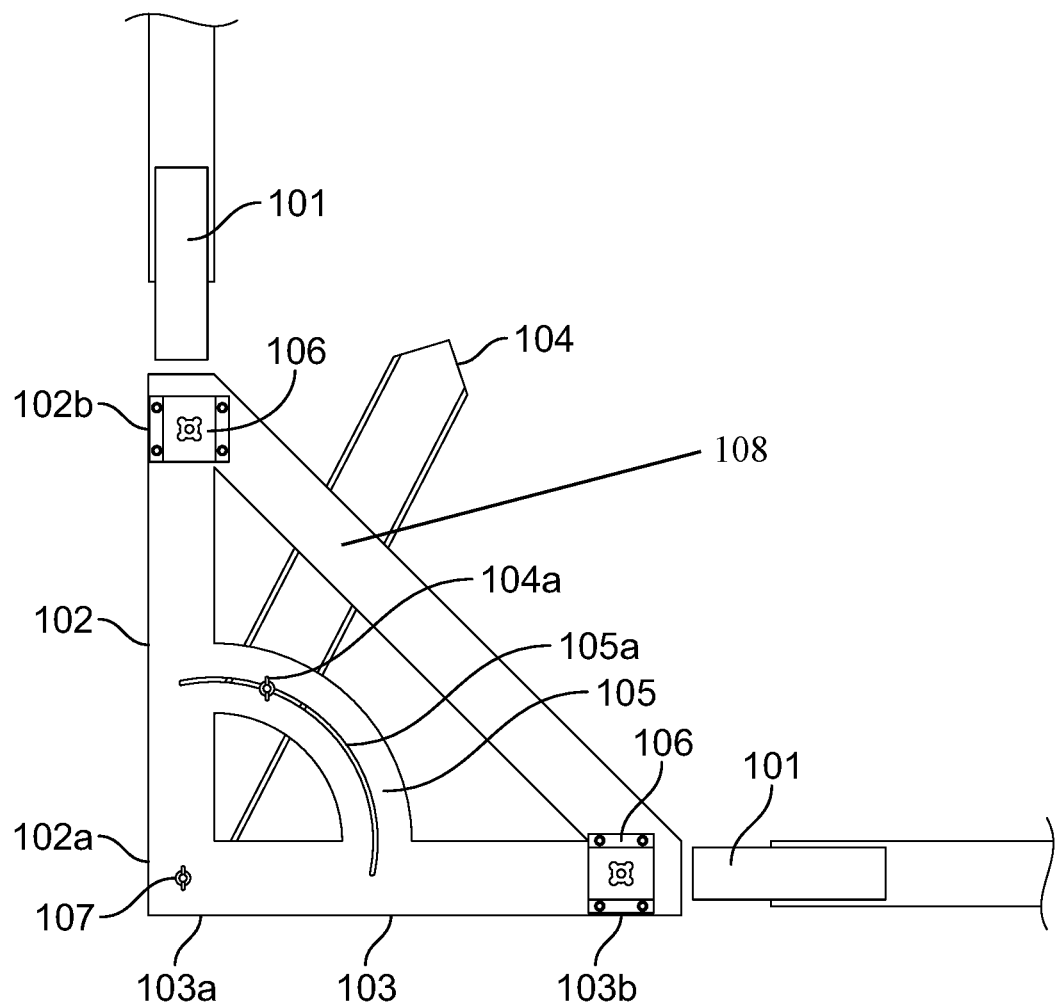

FIG. 1 exemplarily illustrates a rear view of an adjustable angle-measuring device 100 with detached extension members 101. The adjustable angle-measuring device 100 comprises a first linear arm 102, a second linear arm 103, a marking member 104, an arcuate tracking member 105, at least two support channels 106, and extension members 101. In an embodiment, the components of the adjustable angle-measuring device 100 are made of diverse materials, for example, wood, metal, plastic, etc. The first linear arm 102 comprises a first end 102*a* and a second end 102*b*. The first end 102*a* of the first linear arm 102 is rigidly attached perpendicular to a first end 103*a* of a second linear arm 103.

The marking member 104 is detachably attached to an intersecting surface of the first linear arm 102 and the second linear arm 103 to form a pivot 107. An arcuate tracking member 105 extends from the first linear arm 102 to the second linear arm 103 and comprises a guideway 105a. The marking member 104 is configured to move along the guideway 105a configured in the arcuate tracking member 105 to determine an angular measurement between the first linear arm 102 and the marking member 104 or the second linear arm 103 and the marking member 104.

The marking member 104 comprises a locking element 104a to lock the marking member 104 to the arcuate tracking member 105. The adjustable angle-measuring device 100 comprises at least two support channels 106. The support channels 106 are positioned at the second end 102b of the first linear arm 102 and the second end 103b of the second linear arm 103. In an embodiment, the support channels 106 are, for example, strut channels, punched channels, slotted channels, etc. In an embodiment, the support channels 106 are made of materials, for example, stainless steel, fiberglass, etc. Each of the at least two support channels 106 are configured to detachably attach extension members 101.

Figure 2:
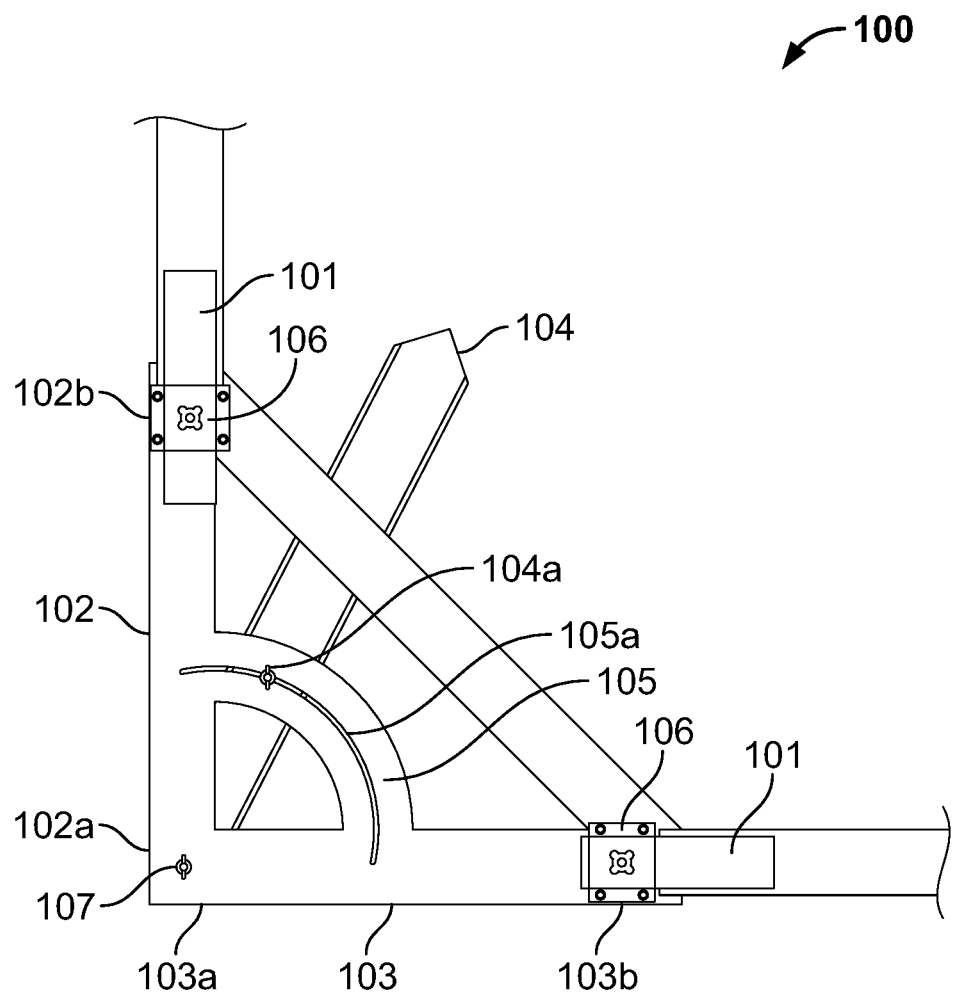
Figure 3:
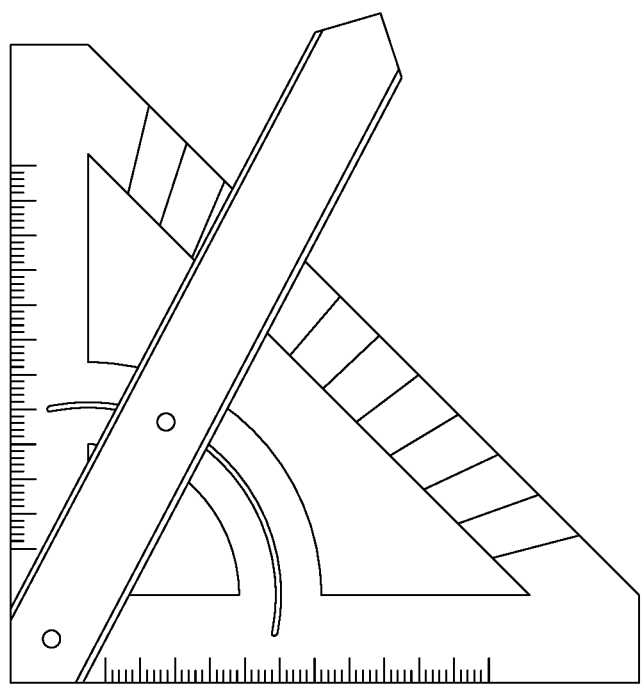
FIG. 3 shows a rear view of the present invention showing marking member 104 on the rear side of the device.
Figure 4:
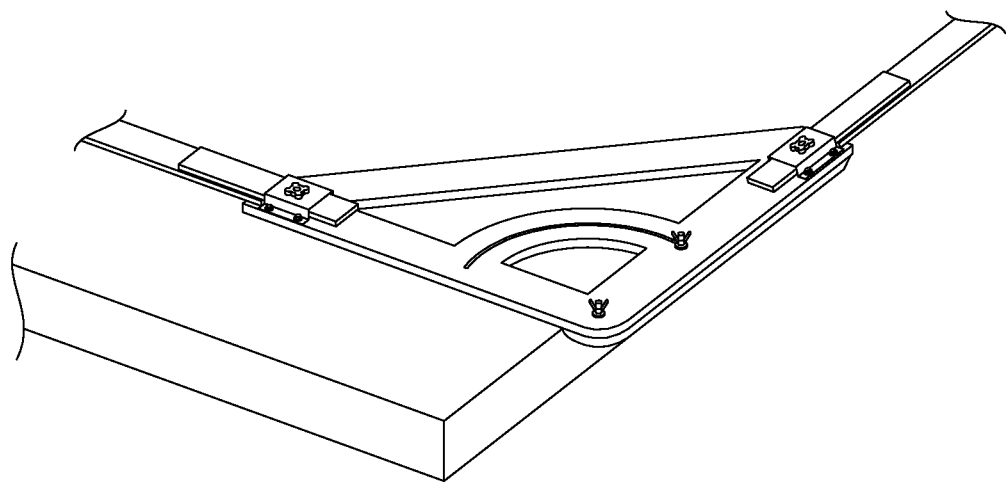
FIG. 4 shows a partial view of the present invention in its operating environment wherein its second linear arm 103 has a thickness designed to act as a lip to engage a surface giving a user a solid engagement while against a surface while using the invention.
Figure 5:
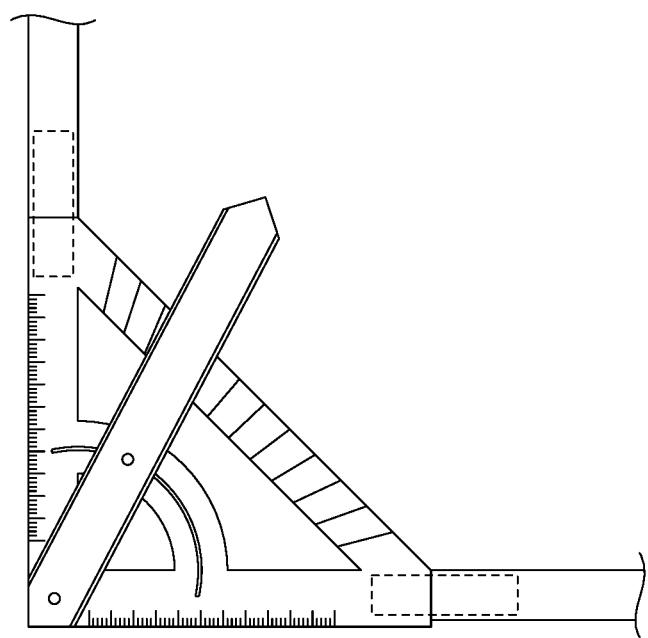
FIG. 5 shows a see-through view of the distal ends of first and second linear members 102; 103 to show how extension members 101 are inserted therein.
Figure 6:
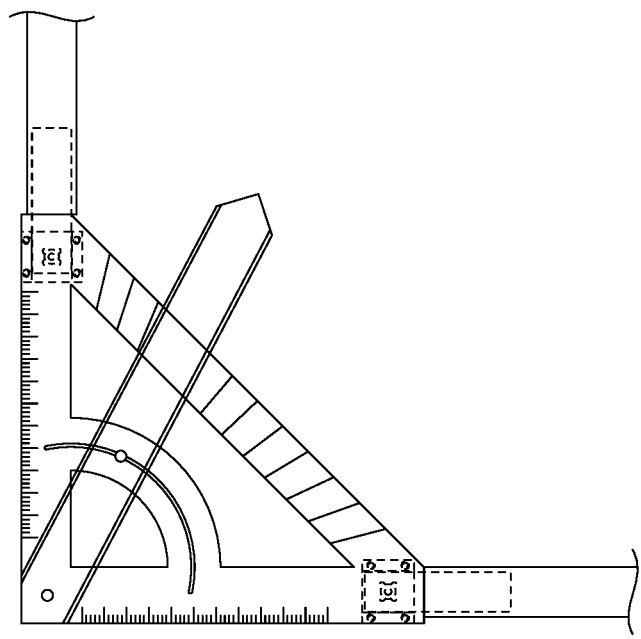
FIG. 6 shows a rear side view of the invention with a see-through view of linear arms 102; 103.
Figure 7:
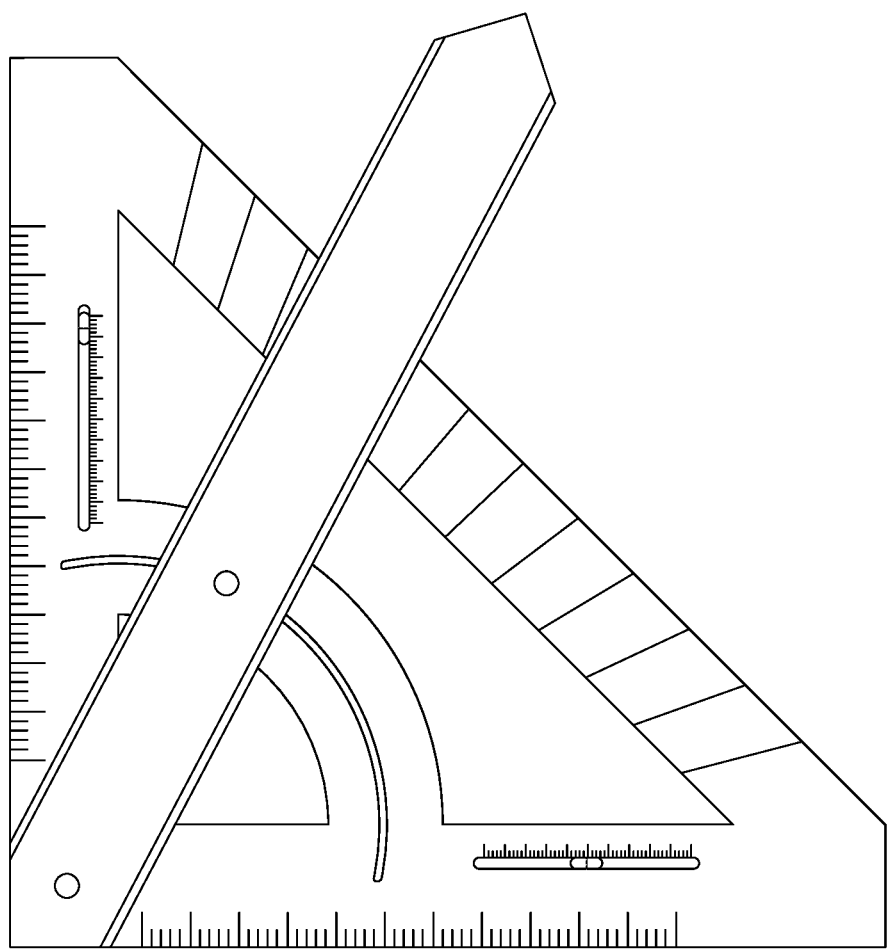
FIG. 7 shows an enlarged view of the present invention showing the levels and angle and linear measurement markers of the present invention.

FIG. 2 exemplarily illustrates a rear view of an adjustable angle-measuring device 100 with attached extension members 101. The adjustable angle-measuring device 100 comprise first and second linear arms 102 and 103 connected at a 90-degree angle at first ends 102a and 103a respectively. An arcuate tracking member 105 comprising a guideway 105a is located between both members. A marking member 104 is mounted at the intersection of the first and second linear arms 102 and 103. The first and second linear arms 102 and 103 extend towards the arcuate tracking member 105. The marking member 104 marks various degrees depending on the measurement required. The distal ends 102b and 103b of both linear arms 102 and 103 includes support channels 106 that receive extension members 101. The distal ends 102b and 103b can also be rigidly mounted to the extension members 101 that are removably mounted thereon. The extension members 101 can also include a male portion that fastens into a female portion at the distal end 102b or 103b of each linear arm 102 or 103 respectively. Marking member 104 can be located at the rear or top of the device. First and/or second linear arm 102; 103 can have a sufficient thickness to create a secure engagement against a surface. As shown in FIG. 4, marking member 104 can be used against a surface to prevent the device from sliding when measuring an object. As shown in FIG. 1, a diagonal member 108 can be included and mounted from distal end 102b to distal end 103b. Diagonal member 108 can include an extension of the angle measurements found on arched angle tracking member 105. Diagonal member 108 can also be used as a ruler.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An angle measuring device, comprising:
   a. two linear arms mounted perpendicular to each other, each having a proximal and distal end and each having a top and bottom surface;
   b. a marking member pivotedly mounted to the intersection of said first and second linear arms' proximal end, said marking member adapted to pivotedly move from underneath said first linear arm's bottom surface in a first extreme to underneath said second linear arm's bottom surface in a second extreme;
   c. an tracking member having a slide and various degree markings extending from said first to said second linear member;
   d. a locking member positioned within said slide and mounted through said marking member and used to lock said marking member when a predetermined angle is reached;
   e. a first and second support channel, said first supporting channel mounted on said first linear arm's top surface and said second supporting channel mounted on said second linear arm's top surface;
   f. a first and second extension member adapted to be inserted within said first and second supporting channels, respectively, and configured to be an extension of first and second linear arms, respectively, said supporting channels each have locking members to secure said first and second extension members to said first and second linear arms; and
   g. a diagonal member connected from said first linear arm distal end to said second linear arm's distal end.

2. The device of claim 1 wherein said first and second linear arms each include a bubble level vial.

3. The device of claim 1 wherein said first and second extension member each include a bubble level vial.

4. The device of claim 1 wherein said first and second linear arms have thickness, said thickness is configured to house said first support channel and said second support channel, said extension members inserted into the thickness of said first and second linear arms and through said first and second support members, thereby concealing said support members.

5. The device of claim 1 wherein said extension members each include length markings to be used as rulers.

6. The device of claim 1 wherein said first and second linear arms and said diagonal member include measurement markings to measure length or angles.

7. The device of claim 1 wherein said first support channel and said second support channel are defined by a square or rectangular housing, said housing is mounted to the distal end of said first or second linear arm, said housing has a width slightly larger than the width of said extensions.

* * * * *